United States Patent
Yu et al.

(10) Patent No.: US 7,120,196 B2
(45) Date of Patent: Oct. 10, 2006

(54) INTRA-PREDICTION USING INTRA-MACROBLOCK MOTION COMPENSATION

(75) Inventors: Siu-Leong Yu, San Jose, CA (US); Christos Chrysafis, Mountain View, CA (US)

(73) Assignee: ESS Technology, Inc., Fremont, CA (US)

(*) Notice: Subject to any disclaimer, the term of this patent is extended or adjusted under 35 U.S.C. 154(b) by 656 days.

(21) Appl. No.: 10/424,205

(22) Filed: Apr. 25, 2003

(65) Prior Publication Data

US 2003/0202588 A1 Oct. 30, 2003

Related U.S. Application Data

(60) Provisional application No. 60/376,674, filed on Apr. 29, 2002.

(51) Int. Cl.
*H04B 1/66* (2006.01)
*H04N 7/12* (2006.01)

(52) U.S. Cl. .................................... 375/240.12

(58) Field of Classification Search .......... 375/240.12, 375/240.13, 240.16, 240.17, 240; 382/236; H04B 1/66; H04N 7/12

See application file for complete search history.

(56) References Cited

U.S. PATENT DOCUMENTS

| | | | | |
|---|---|---|---|---|
| 5,706,059 A | * | 1/1998 | Ran et al. | 348/699 |
| 6,011,870 A | * | 1/2000 | Jeng et al. | 382/236 |
| 6,611,559 B1 | * | 8/2003 | Shingo et al. | 375/240.16 |
| 6,671,321 B1 | * | 12/2003 | Ohtani et al. | 375/240.16 |
| 6,687,303 B1 | * | 2/2004 | Ishihara | 375/240.21 |

* cited by examiner

*Primary Examiner*—Tung Vo
(74) *Attorney, Agent, or Firm*—Farjami & Farjami LLP

(57) ABSTRACT

To encode an unencoded block of a frame, a search window is defined within the frame. Each pixel disposed within the search window and disposed in the unencoded portion of the frame that is assigned a value. A difference is computed between the unencoded block and each possible block within the search window. The block having the smallest difference, together with this difference are used to encode the unencoded block.

27 Claims, 2 Drawing Sheets

INTRA-PREDICTION USING INTRA-MACROBLOCK MOTION COMPENSATION

CROSS-REFERENCES TO RELATED APPLICATIONS

The present application claims priority to provisional application Ser. No. 60/376,674, filed Apr. 29, 2002, the content of which is incorporated herein by reference in its entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to processing of video frames, and more specifically to encoding of blocks disposed in such frames.

Digital transmission of video signals often provide higher quality pictures than their analog counterparts. Digital video is being increasingly broadcast directly to home-installed satellite television receivers. Moreover, with the development of digital video storage media such as Digital Video Disks (DVDs), consumers now have the capability to receive and store compressed digital video in their homes.

Many different video compression techniques have been developed to enable effective transmission and storage of digital video signals. Such techniques often use compression algorithms that take advantage of the correlation among adjacent pixels so as to more efficiently transmit and store video signal. In some systems, differential encoding is used to transmit only the difference between a frame and a prediction of that frame. The predicted frame is often derived from a previous frame of the same video sequence.

Successive frames in a typical video sequence are often very similar to each other. For example, a sequence of frames may have scenes in which an object moves across a stationary background, or a background moves behind a stationary object. Consequently, many scenes in one frame may also appear in a different position of a subsequent frame. Video systems take advantage of such similarities to encode blocks in the frames.

In accordance with the well-known international standards such as H.261, H.263, MPEG-1, MPEG-2, and MPEG-4, motion estimation and compensation are used to encode scene changes between frames. In accordance with the motion estimation technique, data related to the differences between positions of similar objects as they appear in various macroblocks in successive frames are captured by one or more motion vectors to estimate the motion of objects between frames. The motion vectors are then used to identify the spatial coordinates of the shifted objects in a subsequent frame. The motion vectors therefore limit the bit rate that would otherwise be required to encode the data associated with the shifted objects.

In accordance with the well-known motion compensation technique, the motion vectors are subsequently used to predict an unencoded frame. The difference between the predicted frame and the reference frame and which is commonly referred to as the error signal, is then compressed.

Partly due to its computational intensity, a motion vector is shared typically by all color components in (Y,U,V) or (Y, $C_r$, $C_b$) coordinate systems. In the (Y,U,V) color coordinate system, Y is the luma component, and U and V are the chroma components of a color. Similarly, in the (Y, $C_r$, $C_b$) color coordinate system, Y is the luma component, and $C_b$ and $C_r$ are the chroma components. Each motion vector is typically generated for a macroblock. Each macroblock typically includes, e.g., 16×16 or 8×8 pixels. The MPEG-2 standard provides an interlaced mode that separates each 16×16 macroblock into two 16×8 sub-macroblocks each having an associated motion vector.

In MPEG-2, interframe coding is performed on macroblocks. An MPEG-2 encoder performs motion estimation and compensation to compute motion vectors and error signals. For each macroblock M of a frame N, a search is performed across the macroblocks of the next frame, N+1, or the immediately preceding frame, N−1, to identify the most similar macroblocks in frames N+1 or N−1. The location of the most similar block relative to the block M is used to compute a motion vector which, in turn, is used to compute a predicted block for macroblock M. The difference between predicted macroblock and macro block M is used to compute the error signal. The error signal is subsequently compressed using a texture coding method such as discrete cosine transform (DCT) encoding.

To avoid error propagation, achieve random access and support various play modes, such as seeking, fast forward and fast backward, intra-frames (I frames) often require more bits to encode than predicted frames (P frames) or bi-directional frames (B frames). It is desired to have a compression technique that uses fewer number of bits to encode the I frames.

BRIEF SUMMARY OF THE INVENTION

In accordance with the present invention, encoded blocks of a frame are used to encode an unencoded block of the frame. To perform the encoding, a search window is defined within the frame. Each pixel in the search window that falls outside the encoded blocks of the frame is assigned a value. Thereafter, a difference is computed between the unencoded block and each possible block within the search window. The search window block having the smallest difference with the unencoded block is used to encode the unencoded block.

In some embodiments of the present invention, the frame is an intra-frame (I frame). Furthermore, the unencoded block and each of the blocks in the search window is a macroblock having, e.g. 16×16 or 8×8 pixels. In other embodiments, the search window is positioned entirely within the encoded blocks of the frame. In yet other embodiments, the search window includes the entire frame except for the block being encoded. The size and position of the search window may be defined by a user.

In some embodiments, the difference between each two blocks is computed by summing the absolute values of corresponding pixels of the two blocks, in accordance with the following equation:

$$D \cong a_y \sum_i \sum_j |y(i,j) - y'(i,j)| + a_u \sum_i \sum_j |u(i,j) - u'(i,j)| +$$

$$a_v \sum_i \sum_j |v(i,j) - v'(i,j)|$$

where y(i, j) represents a luminance component of a pixel disposed at coordinates (i, j) of the first block (i.e., the unencoded block) and wherein u(i, j) and v(i, j) represent chrominance components of the pixel disposed at coordinates (i, j) of the first block. Similarly, y'(i, j) represents a luminance component of a pixel disposed at coordinates (i, j) of the second block (i.e., within the search window), and where u(i, j) and v(i, j) represent chrominance components of the pixel disposed at coordinates (i, j) of the second block. In the above equation, $a_y$, $a_u$ and $a_v$ are constant coefficients.

After the unencoded block is so encoded, it is removed from the unencoded portion of the frame, added to the encoded portion of the frame, and is subsequently used to encode the remaining unencoded blocks of the frame.

In some embodiments, a block within the search window is selected by moving a fraction of a pixel away from the unencoded block. For example, a block within the search window (i.e., the reference block) whose difference with the unencoded block is to be computed, may be located only one-fourth or one-eight of a pixel away from the unencoded block. To compute the difference in such situations, the reference block is first magnified. If the reference block is displaced from the unencoded block by one-fourth of a pixel, the reference block is magnified by a factor of 4×4. If the reference block is displaced from the unencoded block by one-eight of a pixel, the reference block is magnified by a factor of 8×8. Thereafter, the pixel values of the magnified block are extrapolated using a user-definable filter length to enable the difference between the reference block and the unencoded block to be computed.

DETAILED DESCRIPTION OF THE INVENTION

Figure 1:
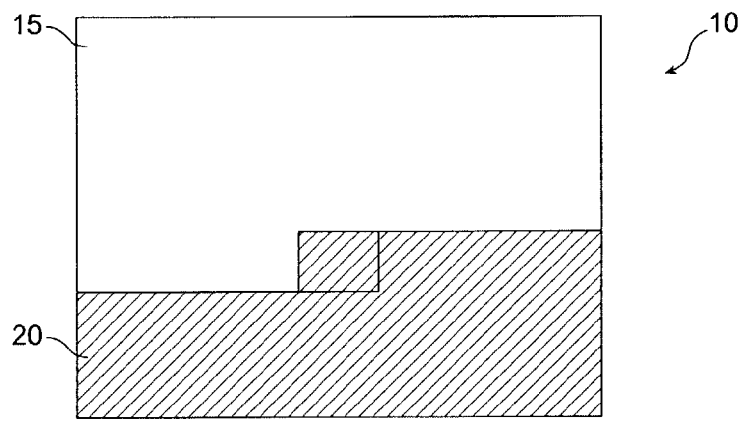
FIG. 1 is a simplified high-level block diagram of a partly encoded I-frame, in accordance with one embodiment of the present invention.

FIG. 1 shows an intra-frame (I-frame) 10 having two sections 15 and 20 Section 15 of I-frame 10 includes only encoded blocks. Section 20 of I-frame 10 includes only unencoded blocks. In accordance with the present invention, the unencoded blocks disposed in section 20 are encoded using the encoded blocks disposed in section 15, as described further below.

Figure 2:
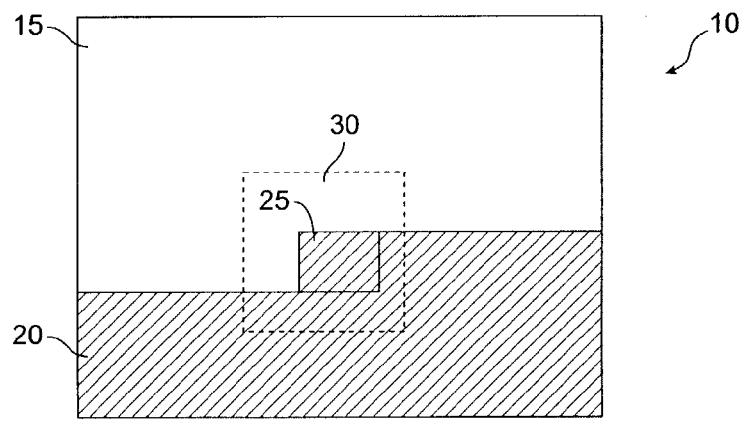
FIG. 2 shows an unencoded block and a search window in the I-frame of FIG. 1.

In the following it is understood that each block may be a macroblock having, e.g. 16×16 or 8×8 pixels. It is understood, however, that the present invention is applicable to blocks having fewer or greater arrays of pixels. It is also understood in the following that although the exemplary embodiment of the present invention is described in reference to an I-frame, the present invention may be used to encode Predicted frames (P frames) and Bidirectional frames (B frames). FIG. 2 shows an unencoded macroblock 25 positioned within unencoded section 20 of I-frame 10 and that is be encoded next in accordance with the present invention.

As seen from FIG. 2, to encode macroblock 25 of unencoded section 20, a search window is defined. This search window is shown within a dashed perimeter line 30 and may be referred to hereinbelow as search window 30. Search window 30 is shown as overlapping regions of encoded section 15 and unencoded section 20. The pixels that are common to search window 30 and unencoded section 20 do not have known values. Therefore, each pixel in this common area is assigned a value. Many of the techniques that are used to assign pixel values when carrying out inter-frame motion estimation and motion compensation, as known to those skilled in the art, may be used to assign these pixel values. For example, in one embodiment, a value of 0 or 128 may be assigned to each of the pixels located in the region of unencoded section 20 that falls within search window 30. In another embodiment, pixel values are assigned using the padding process defined by the MPEG-4 standard. See, for example, International Organisation For Standardisation, Organisation Internationale De Normalisation, ISO/IEC JTC1/SC29/WG11, N3321, "MPEG-4 Video Verification Model version 16.0" by Shigeru Fukunaga, Yuichiro Nakaya, Se Hoon Son, and Takefumi Nagumo, March 2000, pp. 45–48, and incorporated herein by reference.

To encode macroblock 25, each macroblock disposed in search window 30 is compared to macroblock 25 and a difference, described below, between that macroblock and macroblock 25 is computed. The macroblock in search window 30 that has the smallest such difference with macroblock 25 is subsequently used to encode macroblock 25.

A number of different criteria may be used to compute the difference between two macroblocks. Assume that the red, green and blue components of a pixel disposed at coordinates (i, j) of a first macroblock, e.g., macroblock 25, are respectively represented by r(i, j), g(i, j), and b(i, j). Assume further that the red, green and blue components of an associated pixel, i.e., at coordinates (i, j), of a second macroblock, e.g., the macroblock in search window 30 that is being compared to macroblock 25, is represented by r'(i, j), g'(i, j), and b'(i, j). In accordance with one embodiment of the present invention, the difference D between the first and second macroblocks is computed using the following equation:

$$D = \sum_i \sum_j \{[r(i,j) - r'(i,j)]^2 + \qquad (1)$$

$$[g(i,j) - g'(i,j)]^2 + [b(i,j) - b'(i,j)]^2\}$$

As is seen from equation (1), the double summation to compute D is performed over all the pixels of the two macroblocks.

As is known to those skilled in the art, the color transformation between RGB and YUV color coordinate system is as follows:

| R = Y + 1.574 V | ≅ | Y + 1.5 V |
| G = Y − 0.187 U | ≅ | Y − 0.5 V |
| B = Y + 1.856 U | ≅ | Y + 2 U |

Accordingly, equation (1) expressed in the YUV color coordinate system is as follows:

$$D \cong \sum_i \sum_j \{[(y(i,j) - y'(i,j)) + 1.5(v(i,j) - v'(i,j))]^2 + \qquad (2)$$
$$[(y(i,j) - y'(i,j)) - 0.5(v(i,j) - v'(i,j))]^2 + [(y(i,j) - y'(i,j)) + 2(u(i,j) - u'(i,j))]^2\}$$

where y(i, j), u(i, j), and v(i, j) represent the luminance and chrominance components of the pixels disposed at coordinates (i, j) of the first macroblock. Similarly, y'(i, j), u'(i, j), and v'(i, j) represent the luminance and chrominance components of the pixel disposed at coordinates (i, j) of the second macroblock. Ignoring the cross terms, equation (2) may be simplified as:

$$D \cong \sum_i \sum_j \{3[y(i,j) - y'(i,j)]^2 + \qquad (3)$$
$$4[u(i,j) - u'(i,j)]^2 + 2.5[v(i,j) - v'(i,j)]^2\}$$

Equation (3) may be further simplified by replacing the square operator with the absolute value operator, as shown below:

$$D \cong 3\sum_i \sum_j |y(i,j) - y'(i,j)| + 4\sum_i \sum_j | \qquad (4)$$
$$u(i,j) - u'(i,j)| + 2.5\sum_i \sum_j |v(i,j) - v'(i,j)|$$

In equation (4), the following term:

$$\sum_i \sum_j |y(i,j) - y'(i,j)|$$

is alternatively referred to hereinbelow as the sum of absolute difference $SAD_Y$ for component Y. Similarly the other two summations are alternatively referred to as $SAD_u$ and $SAD_V$. Accordingly, for each pair of macroblocks, the distance D is defined as a sum of absolute difference (SAD) of the YUV components.

The constant coefficients (i.e., 3, 4 and 2.5) in equation (4) may be scaled to match human color-perception. Consequently, equation (4) may be expanded into a linear combination of the following three summations:

$$D \cong a_y \sum_i \sum_j |y(i,j) - y'(i,j)| + a_u \sum_i \sum_j | \qquad (5)$$
$$u(i,j) - u'(i,j)| + a_v \sum_i \sum_j |v(i,j) - v'(i,j)|$$

where $a_y$, $a_u$, and $a_v$ are constant coefficients. As described above, the macroblock in search window 30 that has the smallest difference, D, with macroblock 25 together with this difference, D, is used to encode macroblock 25.

Figure 3:
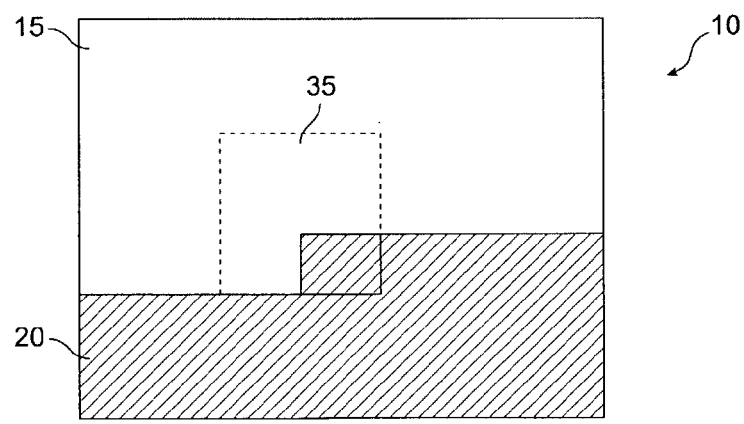
FIG. 3 shows a search window falling outside the unencoded blocks of the I-frame of FIG. 3.

In some embodiments of the present invention, the search window is entirely located within encoded section 15 and thus does not overlap unencoded section 20 of frame 10. FIG. 3 shows a search window 35 that is located entirely within encoded section 15 of frame 10. Because in such an embodiment, the search window is located entirely in the encoded section of the frame, each pixel of the search window has a known value and thus is not required to be assigned a value.

Figure 4:
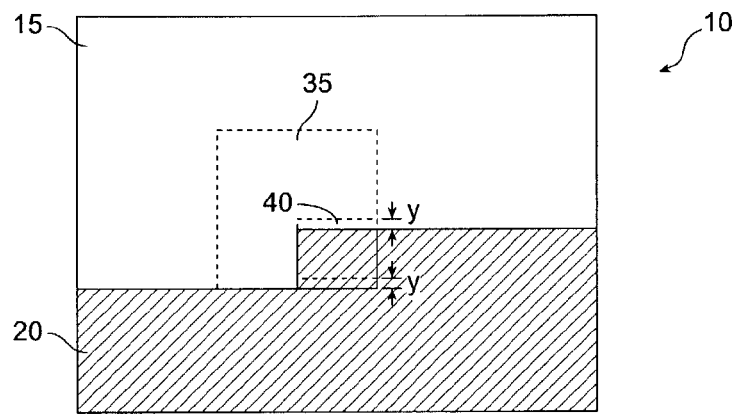
FIG. 4 shows a block in the search window of FIG. 3 that is displaced from the unencoded block by a fraction of a pixel.

In some embodiments, the block being encoded, e.g., macroblock 25, may be displaced by a fraction of pixel, e.g., one-fourth or one-eight of a pixel, from the block within the search widow to which it is being compared. In FIG. 4, macroblock 40 in search window 30 is shown as being displaced from macroblock 25 by a distance y that is a fraction of the distance between two adjacent pixels (not shown).

If the two macroblocks are displaced from one another by one-fourth of a pixel, the macroblock that is being compared to the block being encoded, e.g., macroblock 25, is first magnified by a factor of four. Next, the pixel values of the magnified macroblock are extrapolated from their pre-magnification values using any of the known pixel extrapolation techniques. For example, in some embodiments, a filter length having 7 taps may be used to extrapolate the values of the pixels of the magnified macroblock.

If the two macroblocks are displaced from one another by one-eight of a pixel, the macroblock that is being compared to the block being encoded, e.g., macroblock 25, is first magnified by a factor of eight. Next, the pixel values of the magnified macroblock are extrapolated from their pre-magnification using any of the known pixel interpolation techniques. For example, a filter length having 8 taps may be used to interpolate the values of the pixels of the magnified macroblock. See, for example, International Organisation For Standardisation, Organisation Internationale De Normalisation, ISO/IEC JTC1/SC29/WG11, N3321, "MPEG-4 Video Verification Model version 16.0" by Shigeru Fukunaga, Yuichiro Nakaya, Se Hoon Son, and Takefumi Nagumo, March 2000, pp. 45–48.

Figure 5:
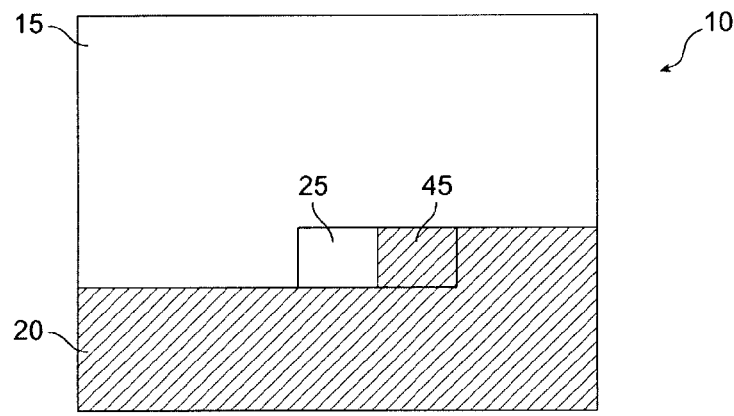
FIG. 5 shows the I-frame of FIG. 1 after the block is encoded, in accordance with the present invention, and added to previously encoded blocks thereof.

After macroblock 25 is encoded, for purposes of encoding, it is removed from unencoded section 20 and added to encoded section 15 of I-frame 10. FIG. 5 shows the unencoded and encoded sections of frame 15 after block 25 is encoded. Because block 25 becomes part of encoded section 15 after it is encoded, block 25 may be used in encoding of block 45 which is shown as being adjacent to block 25, and that is disposed in unencoded section 20 of I-frame 10.

Figure 6:
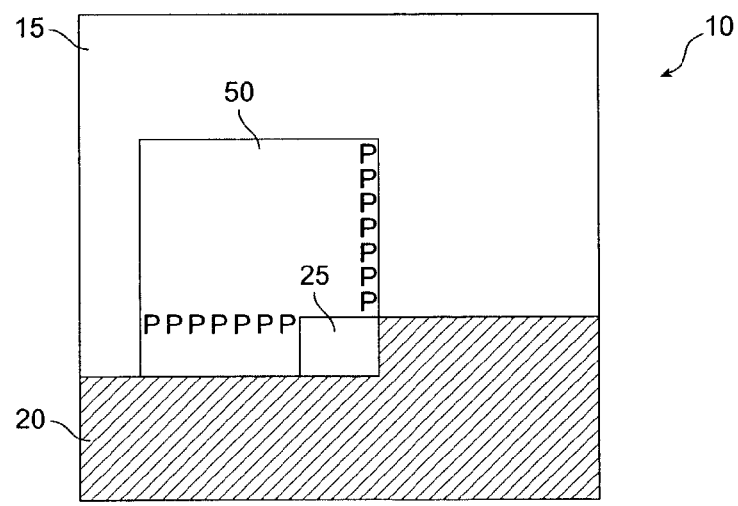
FIG. 6 shows a region of the I-frame of FIG. 1 whose pixels are updated after the block is encoded.

If fractional pixel interpolation is used to encode a block (described above), after the block is encoded, only a subset of the pixels disposed within the frame are updated. FIG. 6 shows block 25 that is encoded using one-fourth fractional pixel interpolation. Also shown in FIG. 6 is block 50 that surrounds block 25 and is spaced away from block 25 by seven pixels along each of its left and top edges. In FIG. 6, each pixel is designated as P. In accordance with one aspect of the present invention, after block 25 is encoded, only the pixels disposed in block 50 are updated. Accordingly, there is no need to update the remaining pixels of frame 10, thereby resulting in faster encoding of frame 10. Therefore, if block 25 is a macroblock having 16×16 pixels, and one-fourth fractional pixel interpolation is used, only 92×92 pixels (i.e., $(4\times(16+8-1))^2$) in the magnified frame are updated. The following equation defines the number of pixels that are updated in a magnified frame, when a block of S×S pixels is being encoded using 1/m fractional pixel interpolation and a filter length of N:

No. of pixels updated=$[(S+N-1)\times m]\times[[(S+N-1)\times m]$

In Table I, under column Δbits (%), shown are the percentage savings in the number of bits used to encode various I-frames, in accordance with the present invention, as compared to conventional techniques. For example, when compared to conventional techniques, encoding of I-frame No. 1, in accordance with the present invention, requires 6.28% fewer bits. Similarly, compared to the conventional techniques, 12.44% percent fewer bits are used to encode I-frame No. 4 using the present invention.

Column Δpsnr (db) of Table I shows the improvement in dB (Decibel) of signal-to-noise ratio of various I-frames when encoded in accordance with the present invention, as compared to conventional techniques. For example, when compared to conventional techniques, encoding of I-frame No. 1, in accordance with the present invention results in 0.35 dB improvement in picture quality. Similarly, when compared to conventional techniques, encoding of I-frame No. 4, in accordance with the present invention, results in 0.52 dB improvement in picture quality. Each CIF frame has 352×288 pixels and each QCIF frame has 176×144 pixels.

TABLE I

| I-frame No. | Frame Size | Δpsnr (dB) | Δbits (%) |
|---|---|---|---|
| 1 | CIF | 0.35 | 6.28 |
| 2 | CIF | 0.10 | 2.13 |
| 3 | CIF | 0.02 | 1.21 |
| 4 | CIF | 0.52 | 12.44 |
| 5 | CIF | 0.09 | 2.40 |
| 6 | CIF | 0.09 | 1.81 |
| 7 | CIF | 0.09 | 2.34 |
| 8 | CIF | 0.28 | 4.54 |
| 9 | CIF | 0.13 | 2.10 |
| 10 | CIF | 0.11 | 2.55 |
| 11 | QCIF | 0.20 | 3.41 |
| 12 | QCIF | 0.04 | 0.72 |
| 13 | QCIF | 0.01 | 1.00 |
| 14 | QCIF | 0.87 | 13.88 |
| 15 | QCIF | 0.09 | 2.01 |
| 16 | QCIF | 0.02 | 0.49 |
| 17 | QCIF | 0.06 | 0.90 |
| 18 | QCIF | 0.12 | 1.57 |
| 19 | QCIF | 0.03 | 0.49 |
| 20 | QCIF | 0.04 | 0.83 |

It is understood that the above embodiments of the present invention may be performed entirely by software modules executed by a central processing unit. The above embodiments may also be performed by a combination of software and hardware modules. Alternatively other embodiments may be performed entirely by dedicated hardware modules.

The above embodiments of the present invention are illustrative and not limitative. Various alternatives and equivalents are possible. The invention is not limited by the size of the search window whose blocks are compared to the unencoded block. Nor is the invention limited by the position of the search window within the frame. The invention is not limited by the technique used to assign values to the pixels within the search window. The invention is not limited by the method used to detect the difference between two blocks. Nor is the invention limited by the method used to determine pixel values of a block that is magnified when the block is positioned away from the unencoded block by a fraction of a pixel. The invention is not limited to the type of frame that may be encoded. For example, the encoding method described above, may be applied to encode P frames and B frames of a group of pictures in a video sequence. Other additions, subtractions, deletions, and other modifications and changes to the present invention may be made thereto without departing from the scope of the present invention and is set forth in the appended claims.

What is claimed is:

1. A method for encoding a first block of a video frame having an encoded portion and an unencoded portion, said first block being in the unencoded portion of the video frame, the method comprising:
   defining a search window;
   calculating differences between pixel values of said first block and corresponding pixel values of each block disposed in the search window, in accordance with a first difference criterion;
   selecting a block from the defined search window that has the smallest calculated difference;
   using the selected block from the search window to encode the first block;
   adding the first block to the encoded portion of the frame after the first block is encoded;
   removing the first block from the unencoded portion of the frame after the first block is encoded; and
   encoding a second block in the unencoded portion of the video frame using the encoded portion of the video frame to which the first block is added.

2. The method of claim 1 wherein said search window is positioned entirely within the encoded portion of the video frame.

3. The method of claim 1 further comprising assigning a value to each pixel within the search window that is not in the encoded portion of the frame, wherein each assigned pixel value is selected from one of zero and 128.

4. The method of claim 1 wherein the first difference criterion is defined by a sum of differences of absolute values of corresponding pixels of two blocks with similar number of pixels.

5. The method of claim 1 wherein the first difference criterion is defined by a sum of squared differences of values of corresponding pixels of two blocks with similar number of pixels.

6. The method of claim 4 wherein the sum D is defined by $$D \cong a_y \sum_i \sum_j |y(i,j) - y'(i,j)| + a_u \sum_i \sum_j |u(i,j) - u'(i,j)| + a_v \sum_i \sum_j |v(i,j) - v'(i,j)|$$

wherein y(i, j) represents a luminance component of a pixel disposed at coordinates (i, j) of a first one of the two blocks and wherein u(i, j) and v(i, j) represent chrominance components of the pixel disposed at coordinates (i, j) of the first one of the two block, wherein y'(i, j) represents a luminance component of a pixel disposed at coordinates (i, j) of a second one of the two blocks and wherein u(i, j) and v(i, j) represent chrominance components of the pixel disposed at coordinates (i, j) of the second one of the two blocks, and wherein $a_y$, $a_u$ and $a_v$ are constants coefficients.

7. The method of claim 1 wherein the block in the unencoded portion of the frame includes one of 16×16 and 8×8 pixels.

8. The method of claim 1 wherein the search window includes the entire frame.

9. The method of claim 1 wherein the search window is set by a user.

10. The method of claim 1 wherein at least one of the blocks in the search window is positioned away from the first block by a fraction of a pixel.

11. The method of claim 10 further comprising: updating a subset of the pixels of the frame after the first block is encoded.

12. The method of claim 1 wherein at least one of the blocks in the search window is positioned away from the first block by one-fourth of a pixel.

13. The method of claim 12 further comprising:
magnifying size of the at least one of the blocks by a factor of 4×4;
determining pixel values of the magnified block by interpolating the pixel values of the at least one of the blocks.

14. The method of claim 13 wherein said pixel values of the magnified block are interpolated in accordance with a filter length defined by a user.

15. The method of claim 13 further comprising updating a region having 92×92 pixels after the first block is encoded, wherein the first block has 16×16 pixels and wherein a filter length is 8.

16. The method of claim 1 wherein at least one of the blocks in the search window is positioned away from the first block by one-eight of a pixel.

17. The method of claim 16 further comprising:
magnifying size of the at least one of the blocks by a factor of 8×8; and
determining pixel values of the magnified block by interpolating the pixel values of the at least one of the blocks.

18. The method of claim 17 further comprising updating a region having 184×184 pixels after the first block is encoded, wherein the first block has 16×16 pixels and wherein a filter length is 8.

19. The method of claim 17 wherein said pixel values of the magnified block are interpolated in accordance with a filter length defined by a user.

20. The method of claim 1 wherein the frame is one I-frame, B-frame and P-frame.

21. An apparatus for encoding a first block of a video frame having an encoded portion and an unencoded portion, said first block being in the unencoded portion of the video frame, the apparatus comprising:
a module for defining a search window;
a module for calculating differences between pixel values of said first block and corresponding pixel values of each block disposed in the search window, in accordance with a first difference criterion;
a module for selecting a block from the defined search window that has the smallest calculated difference;
a module for using the selected block from the search window to encode the first block;
a module for adding the first block to the encoded portion of the frame after the first block is encoded;
a module for removing the first block from the unencoded portion of the frame after the first block is encoded; and a module for encoding a second block in the unencoded portion of the video frame using the encoded portion of the video frame to which the first block is added.

22. The apparatus of claim 21 wherein said selecting module selects a search window that is positioned entirely within the encoded portion of the video frame.

23. The apparatus of claim 21 further comprising a module for assigning a value to each pixel within the search window that is not in the encoded portion of the frame, wherein said assigning module assigns each pixel value from one of zero and 128.

24. The apparatus of claim 21 wherein the first difference criterion is defined by a sum of differences of absolute values of corresponding pixels of two blocks with similar number of pixels.

25. The apparatus of claim 21 wherein the first difference criterion is defined by a sum of squared differences of values of corresponding pixels of two blocks with similar number of pixels.

26. The apparatus of claim 24 wherein the sum D is defined by $$D \cong a_y \sum_i \sum_j |y(i,j) - y'(i,j)| + a_u \sum_i \sum_j |u(i,j) - u'(i,j)| + a_v \sum_i \sum_j |v(i,j) - v'(i,j)|$$

wherein y(i, j) represents a luminance component of a pixel disposed at coordinates (i, j) of a first one of the two blocks and wherein u(i, j) and v(i, j) represent chrominance components of the pixel disposed at coordinates (i, j) of the first one of the two block, wherein y'(i, j) represents a luminance component of a pixel disposed at coordinates (i, j) of a second one of the two blocks and wherein u(i, j) and v(i, j) represent chrominance components of the pixel disposed at coordinates (i, j) of the second one of the two blocks, and wherein $a_y$, $a_u$ and $a_v$ are constants coefficients.

27. A method for encoding a first block of a video frame having an encoded portion and an unencoded portion, said first block being in the unencoded portion of the video frame, the method comprising:
defining a search window, wherein said search window is positioned partially within the encoded portion of the video frame and partially within the unencoded portion of the video frame;
assigning a value to each pixel within the search window that is in the unencoded portion of the frame;
calculating differences between pixel values of said first block and corresponding pixel values of each block disposed in the search window, in accordance with a first difference criterion;
selecting a block from the defined search window that has the smallest calculated difference;
using the selected block from the search window to encode the first block
adding the first block to the encoded portion of the frame after the first block is encoded;
removing the first block from the unencoded portion of the frame after the first block is encoded; and
encoding a second block in the unencoded portion of the video frame using the encoded portion of the video frame to which the first block is added.

* * * * *